(12) United States Patent
Spangler et al.

(10) Patent No.: US 8,281,119 B1
(45) Date of Patent: Oct. 2, 2012

(54) SEPARATE NORMAL FIRMWARE AND DEVELOPER FIRMWARE

(75) Inventors: Randall R. Spangler, San Jose, CA (US); William F. Richardson, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/303,097

(22) Filed: Nov. 22, 2011

(51) Int. Cl.
*G06F 9/00* (2006.01)
*G06F 15/177* (2006.01)

(52) U.S. Cl. ............ 713/2; 713/1; 713/100; 713/176

(58) Field of Classification Search .......... 713/1, 2, 713/100, 176
See application file for complete search history.

(56) References Cited

U.S. PATENT DOCUMENTS

| | | | |
|---|---|---|---|
| 7,343,484 B2 * | 3/2008 | Du et al. | 713/2 |
| 7,827,396 B2 * | 11/2010 | Amou | 713/2 |
| 7,876,469 B2 * | 1/2011 | Hanada | 358/1.16 |
| 7,900,030 B2 * | 3/2011 | Liao | 713/1 |
| 7,934,049 B2 * | 4/2011 | Holtzman et al. | 711/103 |
| 7,996,667 B2 * | 8/2011 | Hwang | 713/2 |
| 8,078,586 B2 * | 12/2011 | Rhoads et al. | 707/674 |
| 8,086,841 B2 * | 12/2011 | Guo et al. | 713/2 |
| 8,189,014 B1 * | 5/2012 | Tam et al. | 345/629 |
| 2003/0031235 A1 * | 2/2003 | Kim et al. | 375/147 |
| 2003/0182547 A1 * | 9/2003 | Kumagai | 713/2 |
| 2004/0158699 A1 * | 8/2004 | Rhoads et al. | 713/1 |
| 2004/0172578 A1 * | 9/2004 | Chen et al. | 714/15 |
| 2005/0055595 A1 * | 3/2005 | Frazer et al. | 713/400 |
| 2005/0289248 A1 * | 12/2005 | Payne | 710/8 |
| 2007/0073978 A1 * | 3/2007 | Lee | 711/141 |
| 2007/0098175 A1 * | 5/2007 | Jakubiec | 380/277 |
| 2008/0263345 A1 * | 10/2008 | Booth et al. | 713/2 |
| 2009/0031122 A1 * | 1/2009 | Hodzic et al. | 713/1 |
| 2009/0031212 A1 * | 1/2009 | Hsu | 715/234 |
| 2009/0198992 A1 * | 8/2009 | Rofougaran | 713/2 |
| 2009/0249065 A1 * | 10/2009 | De Atley et al. | 713/164 |
| 2010/0199078 A1 * | 8/2010 | Shih et al. | 713/2 |
| 2011/0040960 A1 * | 2/2011 | Deierling et al. | 713/2 |
| 2011/0087870 A1 | 4/2011 | Spangler et al. | |
| 2011/0296409 A1 * | 12/2011 | Lo et al. | 718/1 |
| 2011/0296410 A1 * | 12/2011 | Lo et al. | 718/1 |
| 2012/0011354 A1 * | 1/2012 | Owen | 713/2 |

* cited by examiner

*Primary Examiner* — Jaweed A Abbaszadeh
(74) *Attorney, Agent, or Firm* — McDermott Will & Emery LLP

(57) ABSTRACT

A computer-implemented method for booting a computer is disclosed according to an aspect of the subject technology. The computer comprises firmware memory including a first section and a second section. The method comprises determining at boot time whether a developer mode is enabled on the computer, and, if the developer mode is enabled, then booting the computer using developer firmware stored in the first section of the firmware memory. The method also comprises, if the developer mode is disabled, then booting the computer using normal firmware stored in the second section of the firmware memory.

19 Claims, 4 Drawing Sheets

SEPARATE NORMAL FIRMWARE AND DEVELOPER FIRMWARE

FIELD

The subject disclosure generally relates to computers, and, in particular, to developer modes in computers.

BACKGROUND

A computer (e.g., a laptop) may operate in a normal mode and in a developer mode. In the normal mode, the computer performs a verification process during boot to verify that the computer only runs an official operating system (OS) from a trusted supplier. In the developer mode, the computer may run an OS other than an official OS (e.g., an unsigned or self-signed OS). This allows a software developer to build and run its own code on the computer.

SUMMARY

A computer-implemented method for booting a computer is disclosed according to an aspect of the subject technology. The computer comprises firmware memory including a first section and a second section. The method comprises determining at boot time whether a developer mode is enabled on the computer, and, if the developer mode is enabled, then booting the computer using developer firmware stored in the first section of the firmware memory. The method also comprises, if the developer mode is disabled, then booting the computer using normal firmware stored in the second section of the firmware memory.

A machine-readable medium is disclosed according to an aspect of the subject technology. The machine-readable medium comprises instructions stored therein, which when executed by a machine, cause the machine to perform operations for transitioning a computer from a normal mode to a developer mode. The operations comprise determining whether the developer mode is enabled on the computer, and, if the developer mode is enabled, then performing steps. The steps comprise erasing user information from the computer, writing a developer firmware to a firmware memory of the computer, and rebooting the computer, wherein the computer is rebooted using the developer firmware stored in the firmware memory.

A system for booting a computer is disclosed according to an aspect of the subject technology. The system comprises one or more processors, and a machine-readable medium comprising instructions stored therein, which when executed by the one or more processors, cause the one or more processors to perform operations. The operations comprise determining whether a developer mode is enabled on the computer, determining whether a first firmware in a firmware memory requires that the developer mode be enabled to boot the computer using the first firmware, and, if the developer mode is enabled and the first firmware requires that the developer mode be enabled, then booting the computer using the first firmware. The operations also comprise, if the developer mode is disabled and the first firmware requires that the developer mode be enabled, then booting the computer using a second firmware in the firmware memory.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
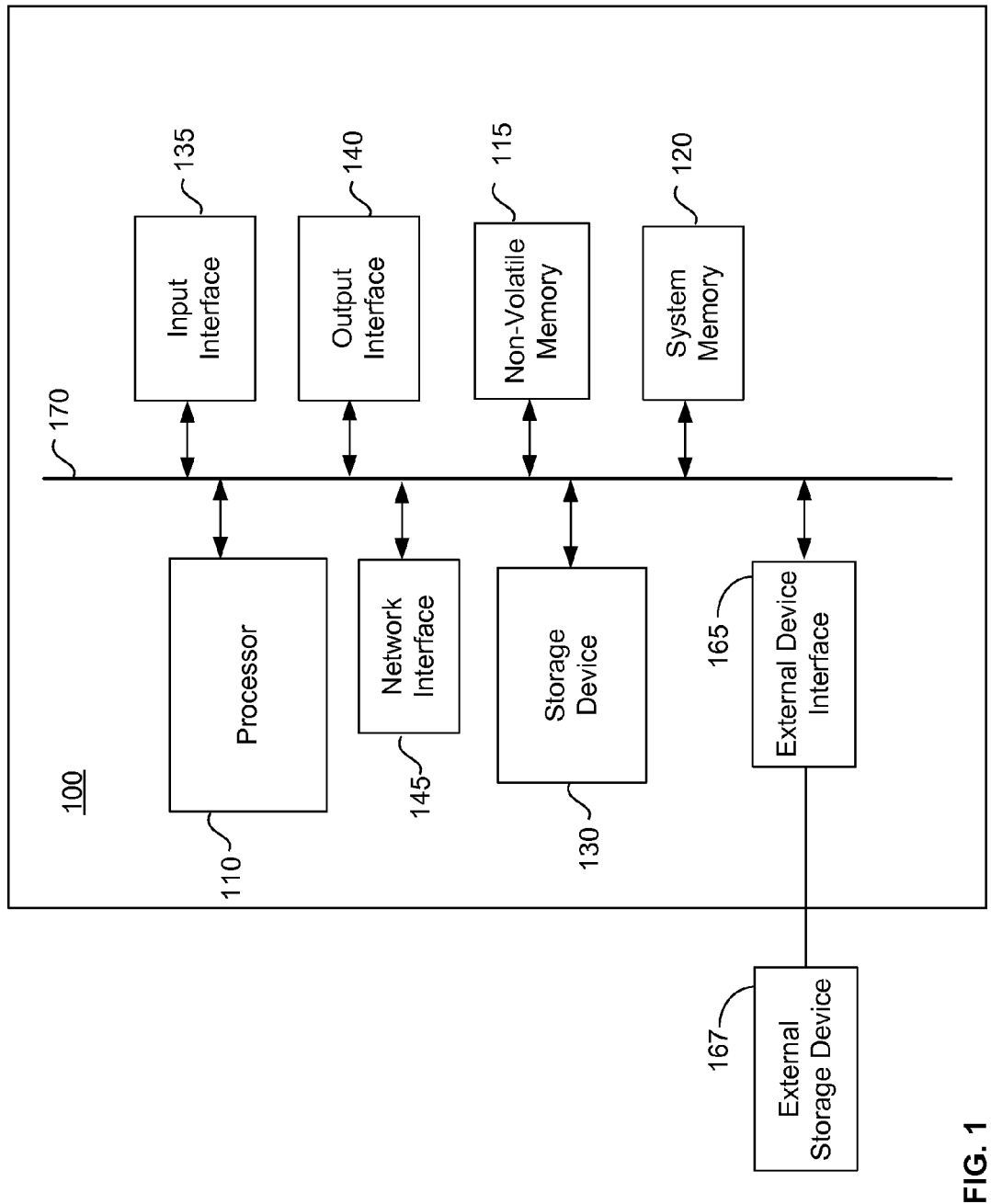
FIG. 1 is a conceptual block diagram of a computer according to an aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A computer (e.g., a laptop) may operate in a normal mode and in a developer mode. In the normal mode, the computer performs a verification process during boot to verify that the computer only runs an official operating system (OS) from a trusted supplier. In the developer mode, the computer may run an OS other than an official OS (e.g., an unsigned or self-signed OS). This allows a software developer to build and run its own code on the computer. A user may enable the developer mode by switching a physical developer switch on or holding down one or more keys on a keyboard during boot time.

The computer may include firmware that supports both the normal mode and the developer mode. During boot, the firmware may determine whether the developer mode is enabled (e.g., whether the developer switch is on). If the developer mode is not enabled (e.g., the developer switch is off), then the firmware may verify that an OS is digitally-signed by a trusted supplier (officially signed), and may only load and execute the OS after successfully verifying that the OS is properly signed. If the developer mode is enabled (e.g., the developer switch is on), then the firmware may display a warning message alerting the user that the developer mode is enabled, and may load and execute an OS other than the officially-signed OS (e.g., an unsigned or self-signed OS). However, the firmware may require additional code to support developer mode functionality. When the computer is operated in the normal mode, the additional code may slow the boot time of the computer.

To address this problem, systems and methods according to various aspects of the subject technology provide separate normal firmware and developer firmware.

The normal firmware may be used to boot the computer in the normal mode. The normal firmware may only load an officially-signed OS regardless of whether the developer mode is enabled (e.g., ignores the state of the developer switch). Therefore, the normal firmware does not require code to check whether the developer mode is enabled (e.g., check the state of the developer switch). Also, since the normal firmware does not boot the computer in developer mode (e.g., load unsigned OS), the normal firmware does not require code to display a warning message altering the user that the computer is booting in developer mode. Because the normal firmware does not need to support developer mode functionality, the normal firmware can be simpler, more secure, and boot faster compared with firmware that supports both the normal mode and the developer mode.

The developer firmware may be used to boot the computer in the developer mode. The computer may only execute the developer firmware when the developer mode is enabled (e.g., the developer switch is on). Additionally, the developer firmware may run an internal check to verify that the developer mode is enabled before allowing the computer to continue to boot in developer mode. Further, the developer firmware may display a warning message alerting the user that the computer is booting in developer mode. The developer firmware may allow the computer to load an unsigned or self-signed OS, as discussed further below.

FIG. 1 shows a computer 100 according to an aspect of the subject technology. The computer 100 may be a laptop computer, a desktop computer, a tablet, a smart phone, or other type of computer. While the computer 100 is shown in one configuration in FIG. 1, it is to be understood that the computer 100 may include additional, alternative and/or fewer devices.

In the example shown in FIG. 1, the computer 100 includes a processor 110, a non-volatile memory 115, a system memory 120, an internal storage device 130, and a bus 170. The bus 170 collectively represents all system, peripheral, and chipset buses that communicatively connect the numerous devices of the computer 100. For instance, the bus 170 communicatively connects the processor 110 with the non-volatile memory 115, the system memory 120, and the internal storage device 130. The processor 110 may retrieve instructions from one or more of these memories 115, 120 and 130 and execute the instructions to implement processes according to various aspects of the subject technology. The processor 110 may comprise a single processor or a multi-core processor in different implementations.

The non-volatile memory 115 may comprise an electrically erasable programmable read-only memory (EEPROM), an embedded multimedia card (e-MMC), a NOR Flash, a NAND Flash, battery-backed RAM, and/or other type of non-volatile memory. The non-volatile memory 115 may be used to store firmware for booting the computer 100 and vital product data providing information about the computer 100. The non-volatile memory 115 is discussed in greater detail below with reference to FIG. 2 according to an aspect of the subject technology.

The internal storage device 130 comprises a read-and-write memory that can store information when the computer 100 is turned off, such as a solid state drive, a magnetic disk drive, or an optical drive. The storage device 130 may be used to store the OS, programs, and/or files. The system memory 120 comprises a volatile read-and-write memory, such a random access memory. The system memory 120 may be used to store instructions and data that the processor 110 needs at runtime.

The computer 100 also includes an input interface 135, an output interface 140, a network interface 145, and an external device interface 165.

The input interface 135 enables a user to communicate information and commands to the computer 100. For example, the input interface 135 may be coupled to an alpha-numeric keyboard and/or a pointing device (e.g., touch pad or mouse). In another example, the input interface 135 may be coupled to a touch screen that receives commands from the user by detecting the presence and location of a user's finger or stylus on the touch screen.

The output interface 140 may be used to communicate information to the user. For example, the output interface 140 may be coupled to a display (e.g., liquid crystal display (LCD)) and/or a printer.

The network interface 145 enables the computer 100 to communicate with a network, for example, a local area network (LAN), a wide area network (WAN), an Intranet, the Internet. The network interface 145 may include a wireless communication module for communicating with the network over a wireless link (e.g., a WiFi wireless link, cellular link, etc.).

The external device interface 165 enables the computer processor 110 to communicate with an external storage device 167 and/or other external device. For example, the external storage device 167 may be coupled to the external device interface 165 via a physical link (e.g., a universal serial bus (USB) link) and/or a wireless link (e.g., a WiFi wireless link, a Bluetooth link, etc.). The external storage device 167 may be a USB drive or a secure digital (SD) card, and the interface 165 may be a USB port or a SD card reader, respectively.

Figure 2:
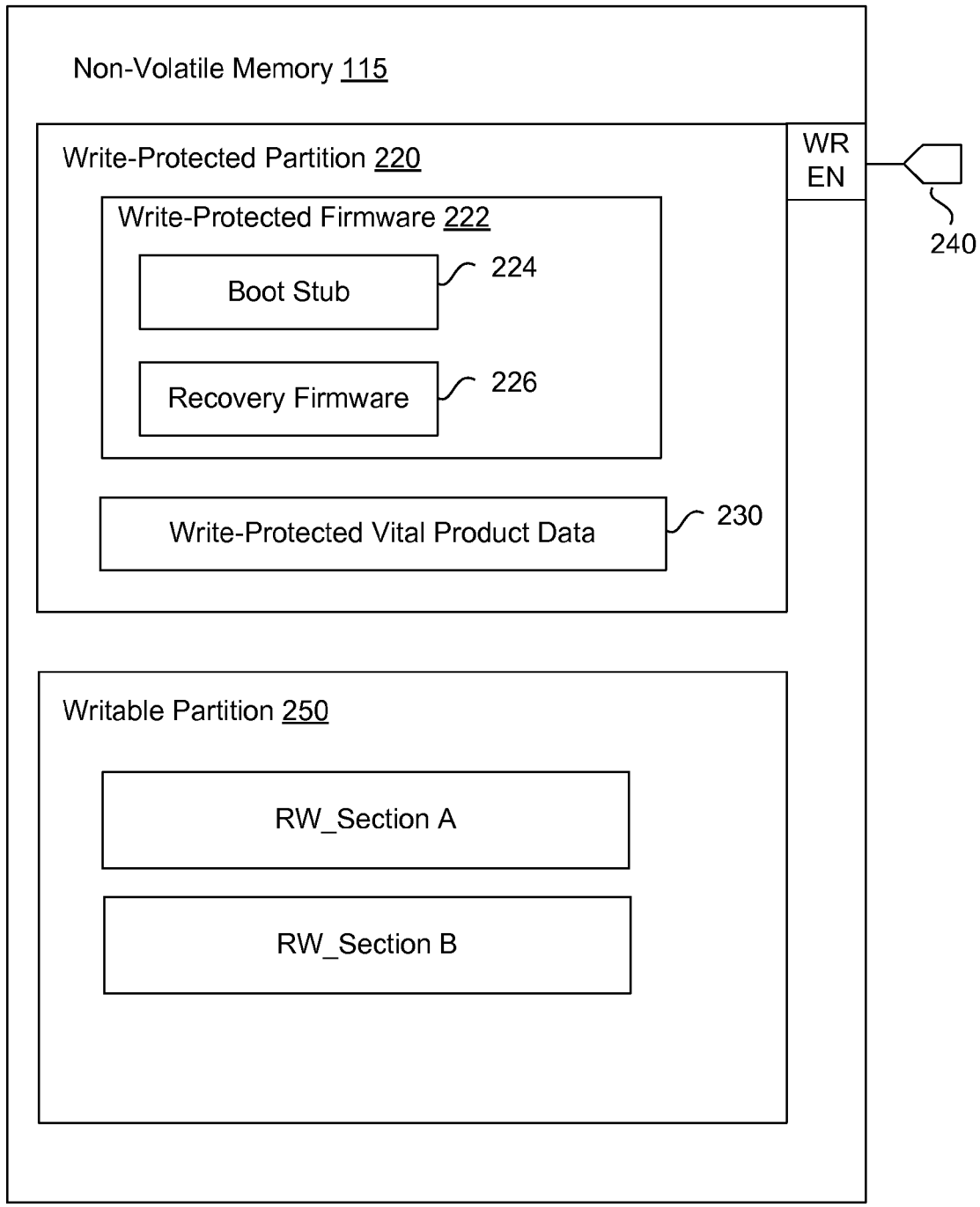
FIG. 2 shows a non-volatile memory according to an aspect of the subject technology.

FIG. 2 is a conceptual block diagram of the non-volatile memory 115 according to an aspect of the subject technology. The non-volatile memory 115 comprises a write-protected partition 220 and a writable partition 250. The non-volatile memory 115 may be configured to allow the processor 110 to read content in the write-protected partition 220, but not to erase and rewrite content in the write-protected partition 220. The write-protected partition 220 may be used to protect system critical firmware (e.g., write-protected firmware) and data from being rewritten by an attacker. The non-volatile memory 115 may be configured to allow the processor 110 to read and write content in the writable partition 250. The writable partition 250 may be used to store content that may be updated (e.g., writable firmware).

In one aspect, the non-volatile memory 115 may include a write-enable pin 240 or write protection pin that controls whether content in the write-protected partition 220 can be rewritten. For example, the write-enable pin 240 may be pulled up to allow writes to the write-protected partition 220 and pulled down to prevent writes to the write-protected partition 220.

In this aspect, content (i.e., write-protected firmware) may be written to the write-protected partition 220 during manufacturing. Before the computer 100 is shipped from the manufacturer, the write-enable pin 240 or write protection pin may be set to prevent the content in the write-protected partition 220 from being rewritten (e.g., by an attacker). For example, the write-enable pin 240 may be pulled down by internal circuitry (not shown) in the computer 100 to prevent the content in the write-protected partition 220 from being rewritten. As a result, content in the write-protected partition 220 cannot be easily rewritten by an attacker without physical access to the internal circuitry of the computer 100. The write-protected partition 220 may be write-protected by another write-protection mechanism (e.g., depending on the type of non-volatile memory used).

The write-protected partition 220 may include write-protected firmware 222 and write-protected vital product data 230. The write-protected vital product data 230 may include machine-specific information that is to remain fixed, such as manufacturer of the computer 100, mother board serial number, MAC address, and/or other information. The write-protected firmware 222 may include a boot stub 224 and recovery firmware 226. The boot stub 224 may be configured to initiate a boot process of the computer 100 when executed by the processor 110 and the recovery firmware 226 may be configured to perform a recovery process when executed by the processor 110 to restore the computer 100 to a known and trusted state, as discussed further below.

The writable partition 250 may include writable firmware stored in separate writable sections, which may be designated read-write (RW)_Section A and RW_Section B. The writable firmware in each section may be configured to complete the boot process initiated by the boot stub 224 when executed by the processor 110. The same type of writable firmware may be stored in RW_Section A and RW_Section B or different types of writable firmware may be stored in RW_Section A and RW_Section B. For example, in the developer mode, the developer firmware may be stored in RW_Section A and the normal firmware may be stored in RW_Section B, as discussed further below.

The normal firmware may be used to boot the computer 100 in the normal mode. The normal firmware may only load an officially-signed OS regardless of whether the developer mode is enabled (e.g., ignores the state of the developer switch). Therefore, the normal firmware does not require code to check whether the developer mode is enabled (e.g., check the state of the developer switch). Also, since the normal firmware does not boot the computer in developer mode (e.g., load unsigned OS), the normal firmware does not require code to display a warning message altering the user that the computer is booting in developer mode. Further, the normal firmware may only load an officially-signed OS from the internal storage device 130. Because the normal firmware does not need to support developer mode functionality, the normal firmware can be simpler, more secure, and boot faster compared with firmware that supports both normal mode and developer mode.

The developer firmware may be used to boot the computer 100 in the developer mode. The computer may only execute the developer firmware when the developer mode is enabled (e.g., the developer switch is on). Additionally, the developer firmware may run an internal check to verify that the developer mode is enabled before allowing the computer to continue to boot in developer mode. Further, the developer firmware may display a warning message alerting the user that the computer is booting in developer mode. The developer firmware may allow the computer to load an unsigned or self-signed OS and may allow the computer to load the unsigned or self-signed OS from the internal storage device or the external storage device.

During boot time, the boot stub 224 may load the writable firmware in either RW_Section A or RW_Section B to continue the boot process. The boot stub 224 may select which writable firmware is used to boot the computer 100 based on a flag or a count value, as discussed further below. Before executing the selected writable firmware, the boot stub 224 may verify that the writable firmware is properly signed by a trusted supplier. For example, the writable firmware may be digitally signed by the trusted supplier using a private key and the boot stub 224 may verify that the firmware is properly signed using a corresponding public key, which may be stored in the write-protected partition 220 or other memory.

If the boot stub 224 is able to verify the selected writable firmware, then the boot stub 224 may execute the selected writable firmware. If the boot stub 224 is unable to verify the selected writable firmware, then the boot stub 224 may attempt to boot the computer 100 using the other writable firmware. If the boot stub 224 is unable to verify the writable firmware in both RW_Section A and RW_Section B, then the boot stub 224 may initiate recovery to restore the computer 100 to a known and trusted state.

The recovery firmware 226 is configured to perform a recovery process when executed by the processor 110. The recovery process may include overwriting the copies of rewritable firmware in RW_Section A and RW Section B with copies of writable firmware digitally signed by a trusted supplier from the external storage device 167 or other memory. As discussed further below, the recovery process may be initiated by the boot stub 224 or other firmware to recover the computer 100.

In one aspect, the computer 100 is shipped from the manufacturer with the developer mode disabled (e.g., developer switch off) and two copies of the normal firmware in RW_Section A and RW_Section B. Thus, the computer 100 initially operates in the normal mode.

The boot stub 224 normally boots the computer 100 using the normal firmware in RW_Section A. If the boot stub 224 is unable to verify the normal firmware in RW_Section A or the computer 100 is otherwise unable to boot using the normal firmware in RW_Section A, then the boot stub 224 may boot the computer 100 using the normal firmware in RW_Section B. This may occur, for example, when copy of the normal firmware in RW_Section A becomes corrupted. Thus, the firmware in RW_Section B may be used as a fall back in case the computer 100 is unable to boot using the firmware in RW_Section A.

If the boot stub 224 is able to verify the normal firmware in RW_Section B after failing to verify the normal firmware in RW_Section A, then the boot stub 224 or other firmware may set an indicator indicating that the computer 100 was booted using the firmware in RW_Section B. In this case, the OS may determine that the computer 100 was booted from RW_Section B based on the indicator and write a new copy of the normal firmware to RW_Section A to repair the normal firmware in RW_Section A.

The normal firmware in RW_Section A and RW_Section B may be updated after the computer 100 is shipped from the manufacturer. For example, an update program may periodically check a server on a network to determine whether a new version of the normal firmware is available on the network. If so, then the update program may download the new version of the normal firmware to one of the memories 120 and 130. The update program may then write the new version of the normal firmware to RW_Section B and set a flag instructing the boot stub 224 to boot the computer 100 using the normal firmware in RW_Section B on the next boot cycle.

On the next boot cycle, the boot stub 224 attempts to boot the computer 100 using the new version of the normal firmware in RW_Section B. If the computer 100 successfully boots using the new version of the normal firmware, then the update program may copy the new version of the firmware to RW_Section A. As a result, two copies of the new version of the normal firmware reside in the non-volatile memory 115. Thereafter, the boot stub 224 may normally boot the computer 100 using the new version of the normal firmware in RW_Section A, and use the new version of the normal firmware in RW_Section B as a fall back.

However, if an error occurs in updating the normal firmware in RW_Section B or the computer 100 is unable to boot using the new version of the normal firmware in RW_Section B, then the boot stub 224 may boot the computer 100 using the old version of the normal firmware in RW_Section A. In this aspect, the new version of the normal firmware is not committed to RW_Section A until the computer 100 is successfully booted using the new version of the normal firmware in RW_Section B. Thus, if the update fails, then the computer 100 can fall back to the old version of the normal firmware in RW_Section A. In this case, the update process may be repeated and/or a copy of the old version of the normal firmware may be written back to RW_Section B.

In one aspect, when the update program writes the new version of the normal firmware to RW_Section B, the update program may set a count value that specifies a number of boot attempts (e.g., six) using the new version of the normal firmware in RW_Section B. In this aspect, the boot stub 224 may attempt to boot the computer 100 using the new version of the normal firmware in RW_Section B until the computer 100 boots successfully using the new version of the normal firmware or the number of boot attempts specified by the count value is reached. An advantage of the count value is that, if the computer 100 is accidently shut down during an attempt to boot the computer 100 using the new version of the normal firmware, then the boot stub 224 may make another attempt to boot the computer 100 using the new version of the normal firmware before giving up and falling back to the old version of the normal firmware in RW_Section A. This increases the reliability of the firmware update.

A workflow for transitioning the computer 100 from the normal mode to the developer mode will now be described according to various aspects of the subject technology.

The user may enable the developer mode (e.g., by switching the developer switch on). At this time, two copies of the normal firmware are stored in RW_Section A and RW_Section B. Therefore, the computer 100 initially boots using the normal firmware since developer firmware is not yet installed in the non-volatile memory 115. As a result, the computer 100 initially boots in the normal mode even though the developer mode is enabled (e.g., developer switch is on).

A program at startup may then determine that the developer mode is enabled. For example, the boot stub 224 may check the physical state of the developer switch at boot time. If the developer switch is on, then the boot stub 224 may set an indicator indicating to the program that the developer mode is enabled.

The program may then display a warning message alerting the user that the developer mode is enabled. The program may display the warning message for a period of time. This prevents an attacker from quickly switching the computer 100 to the developer mode without the user's knowledge when the user is temporarily distracted.

The program may also wipe a stateful partition on the computer 100 to remove personal user information from the computer 100. This prevents an attacker from gaining personal user information using the developer mode. The stateful partition may include user account information, wireless access information, the user's home directory, system logs and/or other user information. The wireless access information may include passcodes for accessing wireless networks and the user account information may include user login information (e.g., passwords) for accessing one or more user accounts. The stateful partition may be stored in the internal storage device 130 and/or other memory.

After the stateful partition is wiped, the program may enable a root shell mode that provides the user with access to the root shell of the OS. The user may then enter a command from the root shell to write the developer firmware to RW_Section A and reboot the computer 100. In one aspect, the developer firmware may be stored in the internal storage device 130 or the external storage device 167 and the user may enter a command to copy the developer firmware from the storage device 130 or the external storage device 167 to RW_Section A. Alternatively, the program may automatically write the developer firmware to RW_Section A and reboot the computer 100 after the stateful partition is wiped. In either case, the developer firmware is written to RW_Section A after the stateful partition is wiped. Writing the developer firmware to RW_Section A may involve erasing the normal firmware from RW_Section A and then writing the developer firmware to RW_Section A. At the end of the write operation, a copy of the developer firmware resides in RW_Section A and a copy of the normal firmware resides in RW_Section B.

When the computer 100 is rebooted, the boot stub 224 may attempt to boot the computer 100 using the developer firmware in RW_Section A. Before executing the developer firmware, the boot stub 224 may verify that the developer firmware is properly signed by a trusted supplier and that the developer mode is enabled (e.g., the developer switch is on). The developer firmware may be digitally signed by the trusted supplier (e.g., computer manufacturer) using a private key and the boot stub 224 may verify the digital signature using a corresponding public key.

In one aspect, the developer firmware may include a flag indicating that the developer firmware is only to be executed when the developer mode is enabled. In this aspect, the boot stub 224 may check the flag and determine that the developer mode needs to be enabled in order to execute the developer firmware. If the boot stub 224 successfully verifies that the developer firmware is properly signed and that the developer mode is enabled, then the boot stub 224 may execute the developer firmware. If the boot stub 224 is not able to verify that the developer firmware is properly signed and/or verify that the developer mode is enabled, then the boot stub 224 may execute the normal firmware in RW_Section B. In this case, a copy of the normal firmware may be written back to RW_Section A, and/or the user may rewrite the developer firmware to RW_Section A and make another attempt to boot the computer 100 in developer mode.

When the developer firmware is executed, the developer firmware may perform an additional check to ensure that the developer mode is enabled (e.g., the developer switch is on). For example, the developer firmware may determine whether the developer mode is enabled by checking the physical state of the developer switch or an indicator from the boot stub 224 indicating whether the developer mode is enabled. The developer firmware may perform this check before loading an unsigned or user-signed OS. If the developer firmware determines that the developer mode is enabled, then the developer firmware may continue to boot the computer 100 in the developer mode. If the developer firmware determines that the developer mode is not enabled, then the developer firmware may reboot the computer 100 in recovery mode. In this case, on reboot, the recovery firmware 226 may be executed to recover the computer 100 by writing officially-signed copies of the normal firmware from the external storage device 167 or other memory to RW_Section A and RW_Section B. The recovery returns the computer 100 to the normal mode.

After verifying that the developer mode is enabled, the developer firmware may display a warning message alerting the user that the computer 100 is booting in developer mode. The developer firmware may give the user the option of getting out of the developer mode by pressing one or more keys (e.g., space/esc/enter key) while the warning message is displayed. If the user presses the one or more keys, then the developer firmware may reboot the computer 100 in recovery mode to return the computer 100 to the normal mode, as discussed above.

If the user allows the computer 100 to continue in developer mode, then the developer firmware may load and execute an unsigned or self-signed OS. The developer firmware may load the unsigned or self-signed OS from the internal storage device 130 or the external storage device 167 to the system memory 120 and/or internal memory of the processor 110. For example, the developer firmware may load the unsigned or self-signed OS from the internal storage device 130 by default and give the user the option of loading the unsigned or self-signed OS from the external storage device 167 (e.g., USB drive or SD card) by pressing one or more keys (e.g., Ctrl+U).

Thus, the developer firmware boots the computer 100 in the developer mode, allowing the computer 100 to run an unsigned or self-signed OS. This allows the user to build and run his/her own code on the computer 100.

The user may configure the developer firmware. For example, the user may configure the developer firmware to only run a self-signed OS. In this aspect, the user may generate a public/private key pair and digitally sign the OS using the private key. The user may then enter commands from the root shell to configure the developer firmware to verify the self-signed OS using the public key. The public key may be stored in RW_Section A, another portion of the non-volatile memory 115, and/or another memory. Thus, the developer firmware may be configured by the user to only run an OS digitally-signed by the user.

The user may also configure the developer firmware to load the unsigned or self-signed OS from a user-specified memory. For example, the developer firmware may load the unsigned or self-signed OS from the internal storage device 130 by default. The user may enter commands from the root shell to configure the developer firmware to load the unsigned or self-signed OS from the external storage device 167 or other memory.

The developer firmware may be updated. For example, the user may manually update the developer firmware by entering commands from the root shell to write a new version of the developer firmware to RW_Section A from the storage device 130, the external storage device 167 or other memory. The new version of the developer firmware may be downloaded onto the computer 100 from the network.

In one aspect, a program may determine whether an update of the developer firmware is available on the network. For example, the developer firmware in the RW_Section A may include version information identifying the version of the developer firmware. At boot time, the boot stub 224 or other firmware may write the version information to the system memory 120 to make the version information readily accessible to the program. The program may periodically connect to a server on the network via the network interface 145 and receive information indicating the latest version of the developer firmware available on the network.

The program may then compare the received information with the version information to determine whether a new version of the developer firmware is available on the network. If so, then the program may download the new version of the developer firmware onto the computer 100 from the network. The program may store the new version of the developer firmware in the internal storage device 130 and/or other memory.

The program may then display an update message alerting the user that an update of the developer firmware is available. Upon viewing the update message, the user may manually update the developer firmware by entering commands from the root shell to write the new developer firmware to RW_Section A. The update message may include instructions instructing the user how to manually update the developer firmware. Thus, the program may alert the user that an update of the developer firmware is available and leave it up to the user to manually update the developer firmware in the non-volatile memory 115.

Alternatively, the program may automatically update the developer firmware. In one aspect, the program may first write the new version of the developer firmware to RW_Section B and set a flag or count value instructing the boot stub 224 to boot the computer 100 using the new version of the developer firmware in RW_Section B on the next boot cycle. For the example of the count value, the program may set the count value to specify a number of boot attempts using the new version of the developer firmware in RW_Section B.

At this point, the new version of the developer firmware resides in RW_Section B and the old version of the developer firmware resides in RW_Section A. On reboot, the boot stub 224 attempts to boot the computer 100 using the new version of the developer firmware in RW_Section B. The boot stub 224 may verify that the new version of the developer firmware is properly signed and that the developer mode is enabled before executing the new version of the developer firmware.

If the computer 100 successfully boots using the new version of the developer firmware in RW_Section B, then the new version of the developer firmware may be written to RW_Section A and the normal firmware may be written to RW_Section B. As a result, the new version of the developer mode resides in RW_Section A and the normal firmware resides in RW_Section B. The normal firmware written to RW_Section B may be an old or new version of the normal firmware. For example, the update program may download both a new version of the developer firmware and a new version of the normal firmware from the network. In this example, the new version of the normal firmware may be written to RW_Section B.

If the computer 100 is unable to boot using the new version of the developer firmware in RW_Section B, then the boot stub 224 may boot the computer using the old version of the developer firmware in RW_Section A. The normal firmware may then be written back to RW_Section B. In this case, the update to the developer firmware fails.

In this aspect, there is a window of time after the new version of the developer firmware is written to RW_Section B and before the computer 100 is rebooted where the non-volatile memory 115 holds two copies of developer firmware and no copy of normal firmware. This is because, immediately after the new version of the developer firmware is written to RW_Section B, the old version of the developer firmware still resides in RW_Section A.

If the user disables the developer mode (e.g., switches the developer switch off) before reboot, then the computer 100 may go into recovery on reboot. This is because the boot stub 224 will not be able to verify either version of the developer firmware since the developer mode is not enabled. In this case, the boot stub 224 may execute the recovery firmware 226 to recover the computer 100. The recovery firmware 226 may write copies of the normal firmware to RW_Section A and RW_Section B from the external storage device 167 or the internal storage device 130. After recovery, the boot stub 224 may attempt to boot the computer 100 using the normal firmware in RW_Section A. If a copy of the official-signed OS resides in the storage device 130 or other memory, then the computer 100 may successfully boot in the normal mode. As part of the recovery process, the recovery firmware 226 may load an officially-signed OS from the external storage device 167 to the internal storage device 130 to ensure that the computer 100 boots successfully in the normal mode.

To transition the computer 100 from the developer mode back to the normal mode, the user may disable the developer mode (e.g., switch the developer switch off). When the computer reboots, the boot stub 224 is unable to verify the developer firmware in RW_Section A since the developer mode is disabled. As a result, the boot stub 224 attempts to boot the computer 100 using the normal firmware in RW_Section B.

If a copy of the official-signed OS still resides in the storage device 130 or other memory, then the computer 100 may successfully boot in the normal mode. A program at startup may then determine that the computer 100 booted from RW_Section B, and write a copy of the normal firmware to RW_Section A. As a result, the firmware memory 100 holds two copies of the normal firmware, same as before. The program may also perform a wipe of the stateful partition.

If the computer 100 is unable to boot using the normal firmware in RW_Section B, then the boot stub 224 may execute the recovery firmware 226 to recover the computer 100. This may occur, for example, when an officially-signed OS no longer resides in the internal storage device 130. As part of the recovery process, the recovery firmware 226 may load an officially-signed OS from the external storage device 167 to the internal storage device 130, allowing the computer 100 to boot in the normal mode.

As discussed above, the recovery firmware 226 may perform a recovery process to recover the computer 100. The recovery process may include writing copies of officially-signed normal firmware to RW_Section A and RW_Section B from the external storage device 167 or other memory. The recovery process may also include writing a copy of an officially-signed OS to the internal storage device 130. After recovery, the computer 100 may reboot in the normal mode. If the developer mode is enabled (e.g., the developer switch is on), then the user may transition the computer 100 back to developer mode by writing the developer firmware to RW_Section A, as discussed above.

During manufacturing of the computer 100, it may be desirable to boot the computer 100 in developer mode. For example, the developer mode allows the manufacturer to run unsigned or self-signed test code on the computer 100 to test various components and operations of the computer 100 during manufacturing.

To operate the computer 100 in developer mode during manufacturing, the developer mode may be enabled (e.g., developer switch is on) and the developer firmware may be stored in RW_Section A. A copy of the normal firmware may be stored in RW_Section B.

Before the computer 100 is shipped from the manufacturer, the developer mode may be disabled (e.g., developer switch is switched off). On the next boot cycle, the boot stub 224 will skip the developer firmware in RW_Section A since the developer mode is disabled and boot the computer 100 using the normal firmware in RW_Section B. At startup, a program may determine that the computer 100 booted from RW_Section B and write a copy of the normal firmware to RW_Section A. Alternatively, the manufacturer may write a copy of the normal firmware to RW_Section A after the developer mode is disabled so that that normal firmware does not need to be written to RW_Section A on the next boot cycle. The manufacturer may also wipe any test code used to test the computer 100 during manufacturing from the storage device 130 and/or other memory.

In one aspect, the user may enable the developer mode by holding down a specific key or a combination of keys on a keyboard at power on or while the computer is booting. The key or combination of keys may comprise pre-existing keys (e.g., Esc and Mute keys) on the keyboard that may be assigned as developer keys during boot time and may be used normally after boot time. This aspect eliminates the need for a physical developer switch to enable the developer mode.

In this aspect, the computer 100 may include a secure memory device (not shown) configured to securely store a developer value. The secure memory device may be implemented using a trusted platform module (TPM) chip or other memory chip that includes one or more lockable memory spaces (e.g., internal registers) for securely storing the developer value. The secure memory device 150 may comprise EEPROM, battery-back RAM or other type of memory capable of storing the developer value across power cycles.

The developer value may indicate whether the user has enabled the developer mode by holding down the developer key(s) during the current boot cycle or a previous boot cycle. For example, the developer value may equal one when the developer mode is enabled and zero when the developer mode is disabled. The boot stub 224 or other firmware may check the developer value to determine whether the developer mode is enabled. A developer value of one provides a persistent indication across boot cycles that the user has enabled the developer mode at sometime. The developer mode may be disabled by clearing the developer value. In this aspect, the boot stub 224 may check the developer value to determine whether the developer mode is enabled since the computer 100 may not have a physical developer switch with a persistent physical state (i.e., developer switch on) that the boot stub 224 can check to determine whether the developer mode is enabled.

In this aspect, when the developer mode is disabled, the boot stub 224 may check the state of the keyboard to determine whether the user is holding down the developer key(s) on the keyboard to enable the developer mode. If the user holds down the developer key(s) for a certain period of time, then the boot stub 224 may set the developer value in the secure memory device to one and lock the developer value in the secure memory device until the next boot cycle. Otherwise, the boot stub may leave the developer value alone and lock the lock the developer value in the secure memory device until the next boot cycle. Locking the developer value until the next boot cycle prevents an attacker from setting the developer value to one to enable the developer mode.

After the developer value is set to one in the secure memory device, the boot stub 224 may set an indicator indicating that the user has enabled the developer mode. At startup, a program may then determine that the user has enabled the developer mode based on the indicator and perform the process for installing the developer firmware in RW_Section A to reboot the computer in developer mode, as discussed above. The process may include wiping the stateful partition to protect personal user information and writing the developer firmware to RW_Section A after the stateful partition is wiped.

After the developer firmware is written to RW_Section A, the computer 100 may be rebooted. The boot stub 224 and/or other firmware may use the developer value in the secure memory device to determine whether the developer mode is enabled. In this aspect, the boot stub 224 may require that the developer mode be enabled, as indicated by the developer value, in order to verify the developer firmware. Similarly, the developer firmware may need to verify that the developer mode is enabled before continuing to boot the computer 100 in the developer mode. On subsequent boot cycles, the boot stub 224 may check the developer value in the secure memory to determine whether the developer mode is enabled and boot the computer using the developer firmware when the boot stub 224 determines that the developer mode is enabled.

In this aspect, the user may disable the developer mode by pressing one or more key(s) on the keyboard. When the user presses the one or more key(s) to disable the developer mode, the boot stub 224 or other firmware may clear the developer value in the secure memory device. In addition, as part of the recovery process, the recovery firmware 226 may automatically clear the developer value in the secure memory device to return the computer 100 to the normal mode. After the developer value is cleared, the boot stub 224 may skip the developer firmware in RW_Section A and boot the computer using the normal firmware in RW_Section B.

Figure 3:
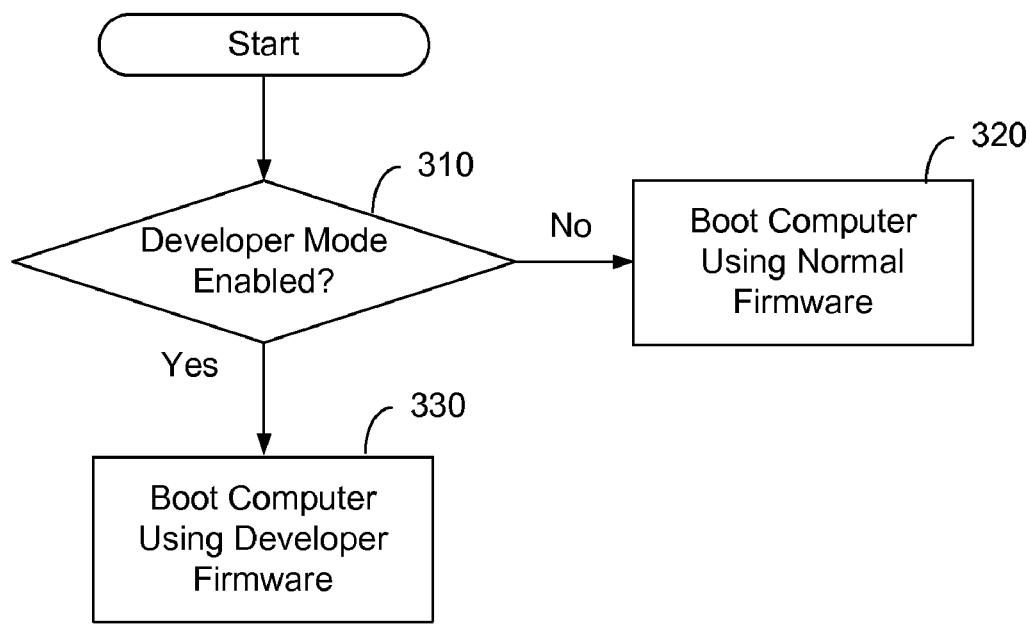
FIG. 3 shows a method for booting a computer according to an aspect of the subject technology.

FIG. 3 shows a method 300 for booting the computer 100 according to an aspect of the subject technology.

In step 310, a determination is made whether the developer mode is enabled. This may be performed by checking whether the developer switch is on or whether the developer value is equal to one. If the developer mode is enabled, then the computer 100 is booted using developer firmware in step 330. For example, the computer 100 may be booted using developer firmware stored in RW_Section A of the non-volatile memory 115.

If the developer mode is not enabled, then the computer 100 is booted using normal firmware in step 320. For example, the computer 100 may be booted using normal firmware stored in RW_Section B of the non-volatile memory 115.

Figure 4:
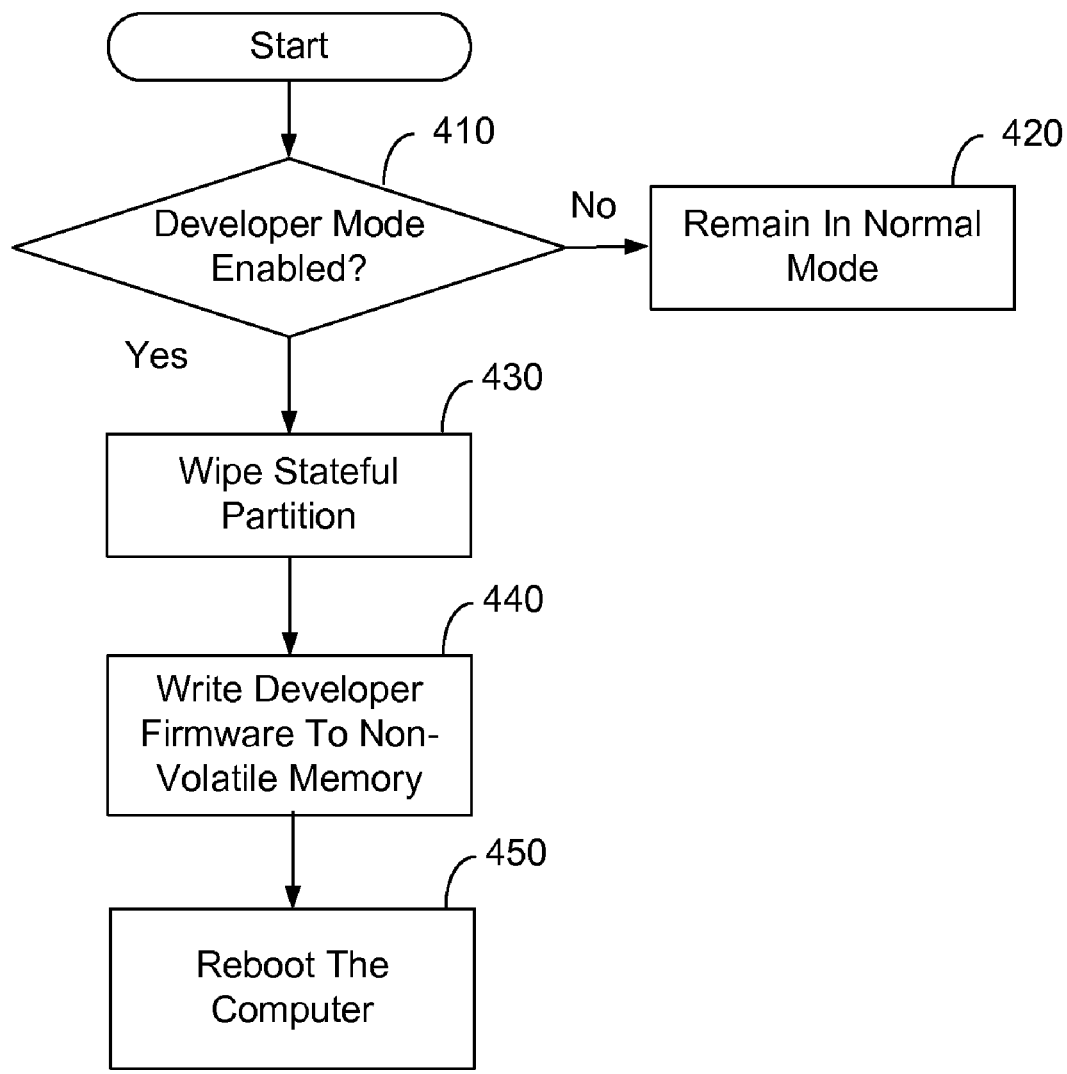
FIG. 4 shows a method for transitioning a computer from normal mode to developer mode according to an aspect of the subject technology.

FIG. 4 shows a method 400 for transitioning the computer 100 from the normal mode to the developer mode. At the start of method 400, two copies of normal firmware may be stored in the RW_Section A and RW_Section B of the non-volatile memory 115.

In step 410, a determination is made whether the developer mode is enabled. This may be performed by checking whether the developer switch is on, whether the developer value is equal to one, or whether the user is holding down one or more keys on a keyboard associated with the developer mode during boot time. If the developer mode is not enabled, then the computer 100 may remain in the normal mode in step 420.

If the developer mode is enabled, then the stateful partition may be wiped in step 430 to remove personal user information from the computer 100.

In step 440, developer firmware is written to the non-volatile memory 115. For example, the developer firmware may be written to RW_Section A of the non-volatile memory 115 while leaving a copy of the normal firmware in RW_Section B.

In step 450, the computer 100 is rebooted. On reboot, the computer 100 may be booted using the developer firmware written to the non-volatile memory 115 in step 440. For example, the boot stub 224 may successfully verify the developer firmware in RW_Section A since the developer mode is enabled, and boot the computer using the developer firmware in RW_Section A.

Many of the above-described features and applications may be implemented as a set of machine-readable instructions stored on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this disclosure, the term "software" and "program" is meant to include firmware or applications stored in a memory, which can be executed by a processor. Also, in some implementations, multiple software aspects can be implemented as sub-parts of a larger program while remaining distinct software aspects. In some implementations, multiple software aspects can also be implemented as separate programs. Finally, any combination of separate programs that together implement a software aspect described here is within the scope of the disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computers and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for booting a computer, wherein the computer comprises firmware memory including a first section and a second section, the method comprising:
   determining at boot time whether a developer mode is enabled on the computer;
   if the developer mode is enabled, then booting the computer using developer firmware stored in the first section of the firmware memory, wherein the developer firmware is configured to load an unsigned operating system or an operating system digitally signed by a user of the computer; and
   if the developer mode is disabled, then booting the computer using normal firmware stored in the second section of the firmware memory.

2. A computer-implemented method for booting a computer, wherein the computer comprises firmware memory including a first section and a second section, the method comprising:
   determining at boot time whether a developer mode is enabled on the computer;
   if the developer mode is enabled, then booting the computer using developer firmware stored in the first section of the firmware memory;
   if the developer mode is disabled, then performing the steps of:
      booting the computer using normal firmware stored in the second section of the firmware memory;
      erasing the developer firmware from the first section of the firmware memory; and
      writing a copy of the normal firmware to the first section of the firmware memory.

3. The method of claim 1, wherein the firmware memory comprises at least one of electrically erasable programmable read-only memory (EEPROM), an embedded multimedia card (e-MMC), a NOR Flash, and a NAND Flash.

4. The method of claim 1, wherein determining whether the developer mode is enabled comprises determining a physical state of a developer switch on the computer.

5. The method of claim 1, wherein determining whether the developer mode is enabled comprises reading a developer value stored in a secure memory.

6. The method of claim 5, further comprising locking the secure memory until a next boot cycle.

7. The method of claim 1, wherein the normal firmware is configured to only load an operating system digitally signed by a trusted supplier.

8. A computer-readable medium comprising instructions stored therein, which when executed by a machine, cause the machine to perform operations for transitioning a computer from a normal mode to a developer mode, the operations comprising:
   determining whether the developer mode is enabled on the computer;
   if the developer mode is enabled, then performing the steps of:
      erasing user information from the computer;

writing a developer firmware to a firmware memory of the computer; and rebooting the computer, wherein the computer is rebooted using the developer firmware stored in the firmware memory.

9. The computer-readable medium of claim 8, wherein determining whether the developer mode is enabled comprises determining a physical state of a developer switch on the computer.

10. The computer-readable medium of claim 8, wherein determining whether the developer mode is enabled comprises determining the user is holding down one or more keys on a keyboard associated with the developer mode.

11. The computer-readable medium of claim 8, wherein the firmware memory initially includes a first section storing a first copy of a normal firmware and a second section storing a second copy of the normal firmware, and wherein writing the developer firmware to the firmware memory comprises:

erasing the first copy of the normal firmware from the first section of the firmware memory; and writing the developer firmware to the first section of the firmware memory, wherein the second copy of the normal firmware remains in the second section of the firmware memory.

12. The computer-readable medium of claim 11, wherein the operations further comprise:

during a subsequent boot cycle, determining whether the developer mode is enabled on the computer; and if the developer mode is not enabled during the subsequent boot cycle, then booting the computer using the normal firmware stored in the second section of the firmware memory.

13. The computer-readable medium of claim 8, wherein the developer firmware is configured to load an unsigned operating system or an operating system digitally signed by a user of the computer.

14. The computer-readable medium of claim 8, wherein the normal firmware is configured to only load an operating system digitally signed by a trusted supplier.

15. A system for booting a computer, comprising: one or more processors; and a computer-readable medium comprising instructions stored therein, which when executed by the one or more processors, cause the one or more processors to perform operations comprising:

determining whether a developer mode is enabled on the computer;

determining whether a first firmware in a firmware memory requires that the developer mode be enabled to boot the computer using the first firmware, wherein the first firmware is configured to load an unsigned operating system or an operating system digitally signed by a user of the computer;

if the developer mode is enabled and the first firmware requires that the developer mode be enabled, then booting the computer using the first firmware; and if the developer mode is disabled and the first firmware requires that the developer mode be enabled, then booting the computer using a second firmware in the firmware memory.

16. The system of claim 15, wherein determining whether the first firmware requires that the developer mode be enabled comprises reading a flag in the first firmware, wherein the flag indicates whether the first firmware requires that the developer mode be enabled.

17. The system of claim 15, wherein determining whether the developer mode is enabled comprises determining a physical state of a developer switch on the computer.

18. The system of claim 15, wherein determining whether the developer mode is enabled comprises reading a developer value stored in a secure memory.

19. The system of claim 15, wherein the second firmware is configured to only load an operating system digitally signed by a trusted supplier.

* * * * *